US012320822B2

(12) United States Patent
Will et al.

(10) Patent No.: US 12,320,822 B2
(45) Date of Patent: Jun. 3, 2025

(54) EVAPORATOR FOR A THERMOGRAVIMETRIC ANALYZER

(71) Applicant: TA Instruments-Waters LLC, New Castle, DE (US)

(72) Inventors: Cornelia Will, Bochum (DE); Joseph D. Michienzi, Plainville, MA (US); Sornanathan Meyyappan, Framingham, MA (US); Jürgen Helmut Neumann, Soest (DE)

(73) Assignee: Waters Technologies Corporation, Milford, MA (US)

( * ) Notice: Subject to any disclaimer, the term of this patent is extended or adjusted under 35 U.S.C. 154(b) by 676 days.

(21) Appl. No.: 17/537,924

(22) Filed: Nov. 30, 2021

(65) Prior Publication Data

US 2022/0178803 A1    Jun. 9, 2022

Related U.S. Application Data

(60) Provisional application No. 63/120,923, filed on Dec. 3, 2020.

(51) Int. Cl.
*G01N 5/00* (2006.01)
*G01G 23/48* (2006.01)
*G01N 5/04* (2006.01)

(52) U.S. Cl.
CPC ............ *G01N 5/04* (2013.01); *G01G 23/48* (2013.01)

(58) Field of Classification Search
CPC .......... G01G 23/48; G01N 5/04; G01N 25/00; G01N 5/00; G01N 1/44; G01N 5/045; G01N 15/0205; G01N 2035/00524; G01N 2035/0439; G01N 23/2202; G01N 23/223; G01N 33/00; G01N 25/14; G01N 25/48;

(Continued)

(56) References Cited

U.S. PATENT DOCUMENTS 6,679,103 B1 *   1/2004   Sadler ................... G01N 25/56
                                                              73/29.01

FOREIGN PATENT DOCUMENTS

CN       106268493 B   *   6/2020   .......... B01F 15/0454
CN       113063695 A   *   7/2021   ............... G01N 5/04
(Continued)

OTHER PUBLICATIONS

17537924_2024-08-26_CN_106268493_B_H.pdf,Jun. 26, 2020.*
(Continued)

*Primary Examiner* — Gail Kaplan Verbitsky
(74) *Attorney, Agent, or Firm* — Schmeiser, Olsen & Watts LLP; William G. Guerin, Esq.

(57) ABSTRACT

Described is a thermogravimetric analyzer system. The system includes an evaporator having first and second fluidic channels and a thermally controlled heater assembly. The first fluidic channel has a first channel inlet in fluidic communication with a gas supply module, a first channel outlet and an end portion extending from the first channel outlet. The second fluidic channel has a second channel inlet in fluidic communication with a source of liquid and a second channel outlet disposed on the first fluidic channel at a merge location between the first channel inlet and the first channel outlet. The end portion of the first fluidic channel includes a bend to redirect a flow within the first fluidic channel and improve a mixing of the gas and liquid received by the first and second fluidic channels, respectively.

13 Claims, 10 Drawing Sheets

(58) Field of Classification Search
CPC .. G01N 1/10; G01N 15/08; G01N 2291/0256;
G01N 25/02; G01N 25/20; G01N
25/4866; G01N 25/56; G01N 27/02;
G01N 29/036; G01N 31/005; G01N
33/0057; G01N 33/18; G01N 33/1813;
G01N 7/14; G01N 9/30; B01F 25/4332;
B01F 2035/99; B01F 31/10; B01F 31/23;
B01F 31/25; B01F 33/85; B01F 35/92;
G01K 1/143; G01K 17/00
See application file for complete search history.

(56) References Cited

FOREIGN PATENT DOCUMENTS

| | | | | | |
|---|---|---|---|---|---|
| DE | 1901201 | A1 | * | 6/1970 | |
| DE | 102006023146 | A1 | * | 11/2007 | ............. B01D 53/90 |
| DE | 112012005245 | T5 | * | 10/2014 | ............. C01B 31/02 |
| EP | 1939136 | A2 | | 7/2008 | |
| FR | 2610105 | A1 | * | 7/1988 | |
| JP | H053982 | U | * | 1/1993 | |
| JP | 2005518518 | A | * | 6/2005 | |
| JP | 2005291521 | A | * | 10/2005 | |
| JP | 2009198462 | A | | 9/2009 | |
| KR | 200401831 | Y1 | | 11/2005 | |
| WO | 2013149395 | A1 | | 10/2013 | |
| WO | WO-2021032809 | A1 | * | 2/2021 | ............. A24F 40/10 |

OTHER PUBLICATIONS

17537924_2024-08-26_DE_102006023146_A1_H.pdfNov. 22, 2007.*
17537924_2024-08-26_DE_112012005245_T5_H.pdf,Oct. 9, 2014.*
17537924_2024-08-26_DE_1901201_A1_H.pdf, Jun. 4, 1970.*
17537924_2024-08-26_FR_2610105_A1_H.pdf, Jul. 29, 1988.*
17537924_2024-08-26_JP_2005291521_A_H.pdf,Oct. 20, 2005.*
17537924_2024-08-26_JP_2005518518_A_H.pdf,Jun. 23, 2005.*
17537924_2024-08-26_WO_2021032809_A1_H.pdf,Feb. 25, 2021.*
17537924_2024-08-26_JP_H053982_U_H.pdf, Jan. 22, 1993.*
17537924_2024-12-12_CN_113063695_A_H.pdf,Jul. 2, 2021.*
Linseis, "Simultaneous thermal analysis," Jan. 1, 2020, https://www.linseis.com/wp-content/uploads/2020/01/LINSEIS-STA_v5_compressed.pdf.
Linseis, "Water Vapor and Relative Humidity," May 1, 2021, https://www.linseis.com/wp-content/uploads/2021/06/LINSEIS-Water-Vapor.pdf.
International Search Report and Written Opinion in PCT/US2021/061111 mailed on Mar. 22, 2022.
International Preliminary Report on Patentability in PCT/US2021/061111 mailed on Jun. 15, 2023.
Examination Report in EP Patent Application No. 21839722.2 mailed on Feb. 28, 2025.

* cited by examiner

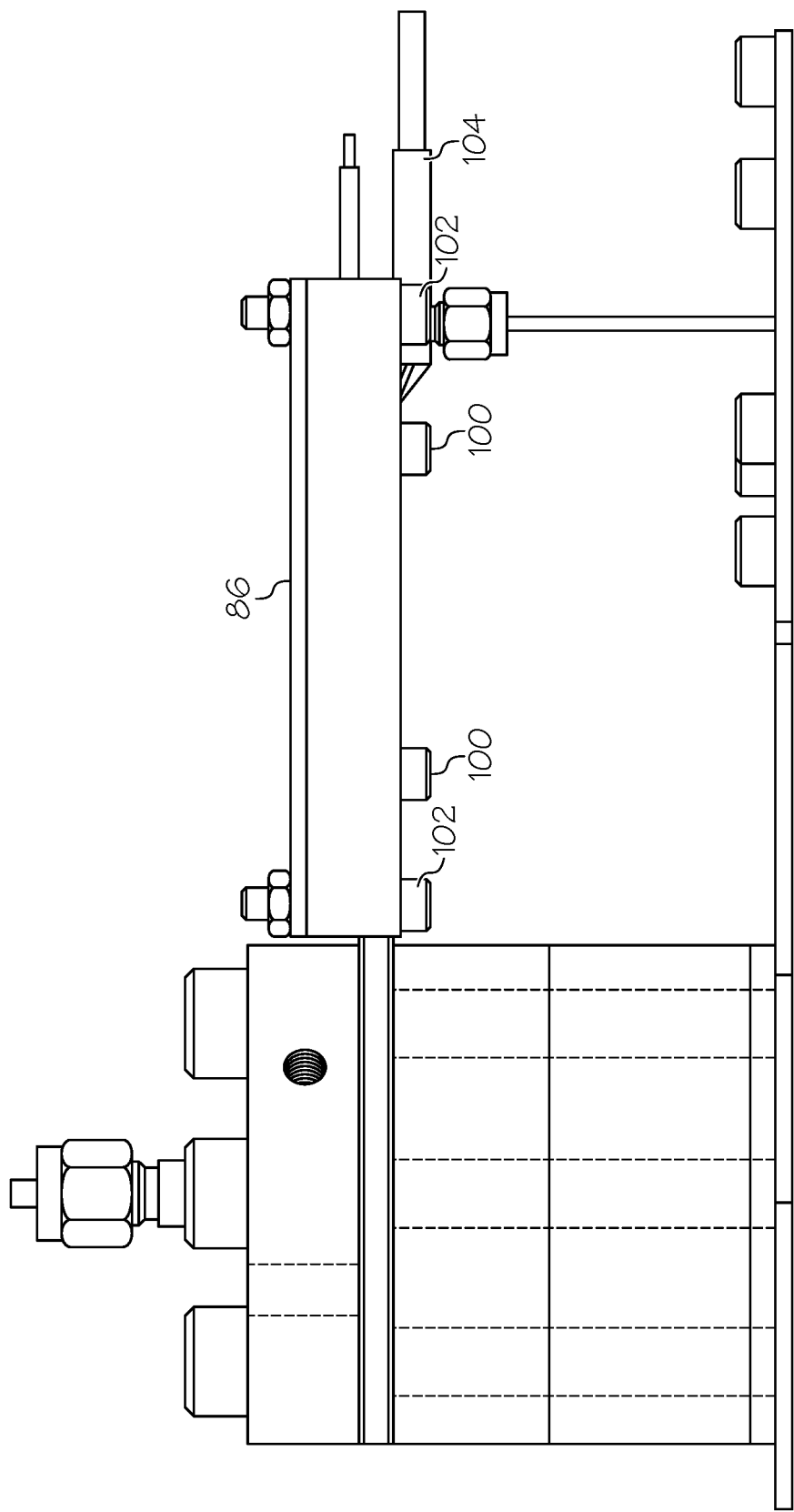

EVAPORATOR FOR A THERMOGRAVIMETRIC ANALYZER

RELATED APPLICATIONS

This application claims the benefit of the earlier filing date of U.S. Provisional Patent Application Ser. No. 63/120,923, filed Dec. 3, 2020, and titled "Evaporator for a Thermogravimetric Analyzer," the entirety of which is incorporated herein by reference.

FIELD OF THE INVENTION

The technology generally relates to thermogravimetric analysis. More particularly, the technology relates to an evaporator for a thermogravimetric analyzer. The evaporator may be used, for example, for enabling a steam environment for a furnace of a thermogravimetric analysis system.

BACKGROUND

Thermogravimetric analysis is a type of thermal analysis in which the mass of a sample is measured over time while the temperature of the sample changes. Thermogravimetric analysis measurements yield information about physical and chemical phenomena. For example, absorption, adsorption, desorption and phase transitions associated with a sample may be determined.

A thermogravimetric analyzer (TGA) is an instrument used to perform thermogravimetric analysis of a sample. The instrument typically includes a furnace that encloses a sample holder. The temperature of the environment inside the furnace is controlled. For example, the furnace temperature may be increased at a constant rate. The thermal reaction of a sample with respect to temperature may be monitored using different atmospheres, including different gases and different gas pressures.

For some measurements, a vapor-controlled atmosphere is desired. For example, a gas or a controlled mixture of gases under pressure may be combined with a flow of water to achieve a steam environment inside the furnace. An evaporator is a component that is used to heat a dry gas or gas mixture which is acting as a carrier gas to pick up liquid water and evaporate the water to create a homogeneous steam mixture. At the output of the evaporator the steam mixture enters the measuring cell of the TGA. Known evaporators generally are large in size and are provided as a separate component alongside the main TGA instrument. Furthermore, such evaporators typically require additional heated feed throughs or heated tubing to conduct the steam to the instrument and prevent the homogeneous steam mixture from condensing and separating prior to its use as a reactant in the heated measuring cell.

SUMMARY

In one aspect, a TGA system includes a gas supply module, a source of liquid, an evaporator, a furnace and a processor. The evaporator includes a first fluidic channel, a thermally controlled heater assembly and a second fluidic channel. The first fluidic channel has a first channel inlet in fluidic communication with the gas supply module, a first channel outlet and an end portion extending from the first channel outlet. The end portion includes a bend to redirect a flow within the first fluidic channel. The thermally controlled heater assembly is in thermal communication with the first fluidic channel. The second fluidic channel includes a second channel inlet in fluidic communication with the source of liquid and a second channel outlet disposed on the first fluidic channel at a merge location between the first channel inlet and the first channel outlet. The furnace has a furnace inlet in fluidic communication with the first channel outlet and a furnace outlet in fluidic communication with a back-pressure regulator. The processor is in communication with the gas supply module, the thermally controlled heater assembly and the back-pressure regulator and is configured to control a temperature, pressure and vapor concentration in the furnace.

The TGA system may include a gas-liquid separator in fluidic communication with the furnace outlet and may include a levitation balance module mechanically coupled to the furnace.

The source of liquid may include a water pump. The furnace may include a sample holder to support a sample during thermogravimetric analysis measurements.

In another aspect, an evaporator includes a first fluidic channel, a thermally controlled heater assembly and a second fluidic channel. The first fluidic channel has a first channel inlet configured to receive a flow of gas, a first channel outlet and an end portion extending from the first channel outlet. The end portion includes a bend to redirect a flow within the first fluidic channel. The thermally controlled heater assembly is in thermal communication with the first fluidic channel. The second fluidic channel includes a second channel inlet configured to receive a flow of liquid and a second channel outlet disposed on the first fluidic channel at a merge location between the first channel inlet and the first channel outlet of the first fluidic channel.

At least a portion of the first fluidic channel may be defined in a plane and a portion of the first fluidic channel between the bend and the first channel outlet may extend out from the plane. The end portion of the first fluidic channel may include a plurality of bends and a portion of the first fluidic channel downstream from one of the bends may extend out from the plane.

The liquid may be water.

At least a portion of the first fluidic channel may be defined in a plane of a diffusion-bonded body. The thermally controlled heater assembly may be in thermal contact with a side of the diffusion-bonded body.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. In the figures, like reference numerals designate corresponding parts throughout the different views.

FIGS. 4A and 4B are a side view and an exploded side view, respectively, of the components in the upper portion of the TGA system of FIGS. 3A and 3B.

DETAILED DESCRIPTION

TGAs are used to perform thermogravimetric analysis of a sample. A TGA typically includes a furnace that encloses a sample holder. The furnace provides a temperature-controlled environment for the sample. For example, the temperature can be increased over time while the mass of the sample is measured. Measurements may be made using a single gas or a mixture of gases and may be performed at different gas pressures.

Figure 1:
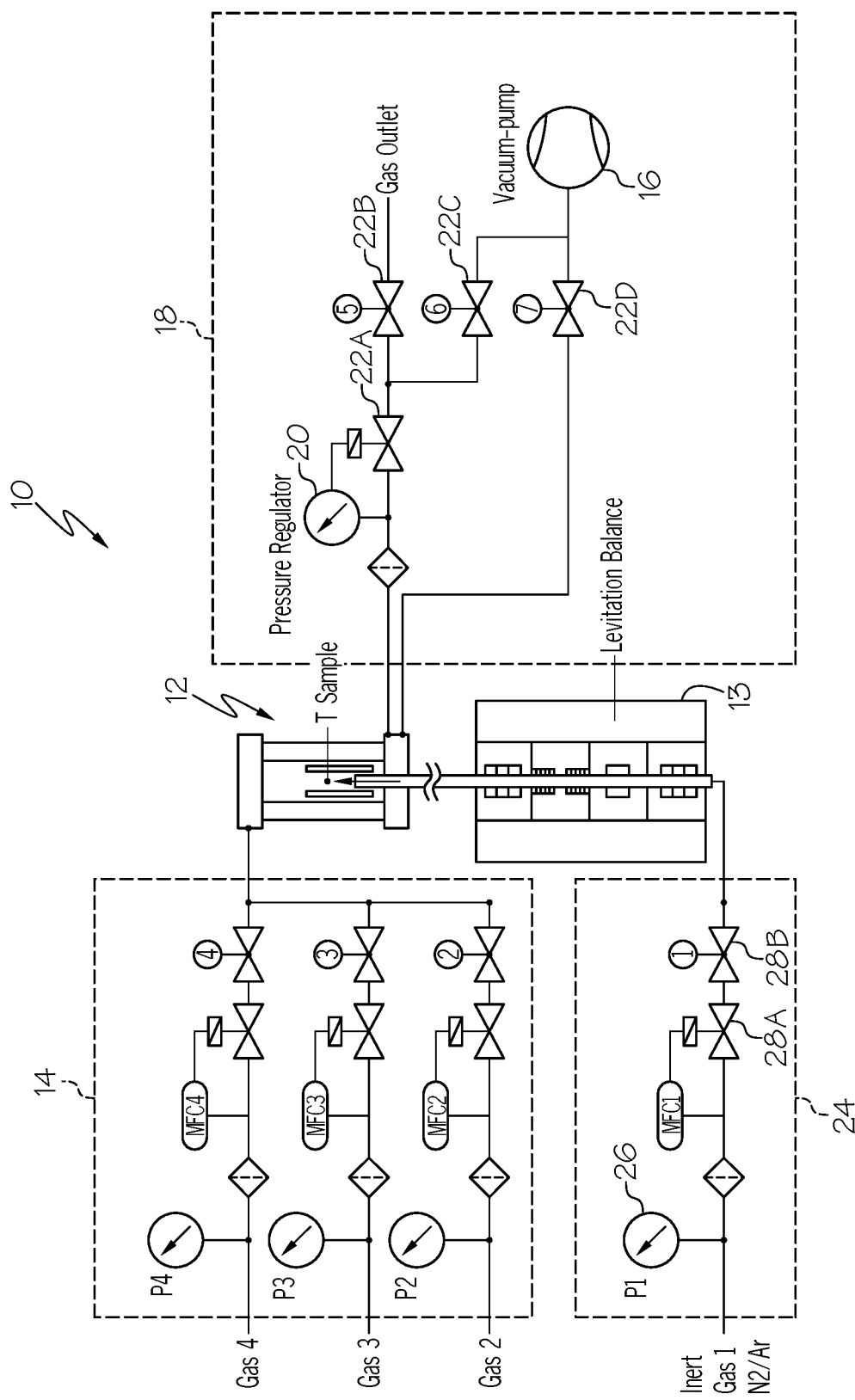
FIG. 1 is a schematic depiction of a conventional high pressure TGA (HP-TGA) system with a dry gas flow mixing system.

FIG. 1 is a schematic drawing showing a conventional configuration for an HP-TGA system 10. The system 10 includes a furnace 12, a levitation balance module 13, a gas supply module 14 configured to provide one or more gases to the furnace 12, a vacuum pump 16 and multiple pressure sensors and controllable valves configured to perform various functions before, during and after thermogravimetric measurements. For example, module 18 includes a back-pressure regulator, a pressure sensor 20, multiple valves 22A to 22D, and the vacuum pump 16. The module 18 is used to control the pressure inside the furnace 12 and to exhaust or purge the furnace 12 after a measurement. By way of a non-limiting example, the pressure may be controlled from approximately 0.02 MPa (200 mbar) to approximately 8 MPa (80 bar). Module 24 includes a pressure sensor 26 and valves 28A and 28B used to provide one or more inert gases such as nitrogen and/or argon to the furnace 12.

A high-pressure gas mixture is provided by the gas supply module 14. As illustrated, the gas supply module 14 may provide a single gas or a mixture of two or three gases to the inlet of the furnace 12. The measurements are performed in a dry environment. During a measurement, the furnace 12 heats a sample according to a time-dependent temperature profile while the pressure of the furnace environment is controlled. Measurements of the mass of the sample are acquired throughout execution of the temperature profile.

Figure 2:
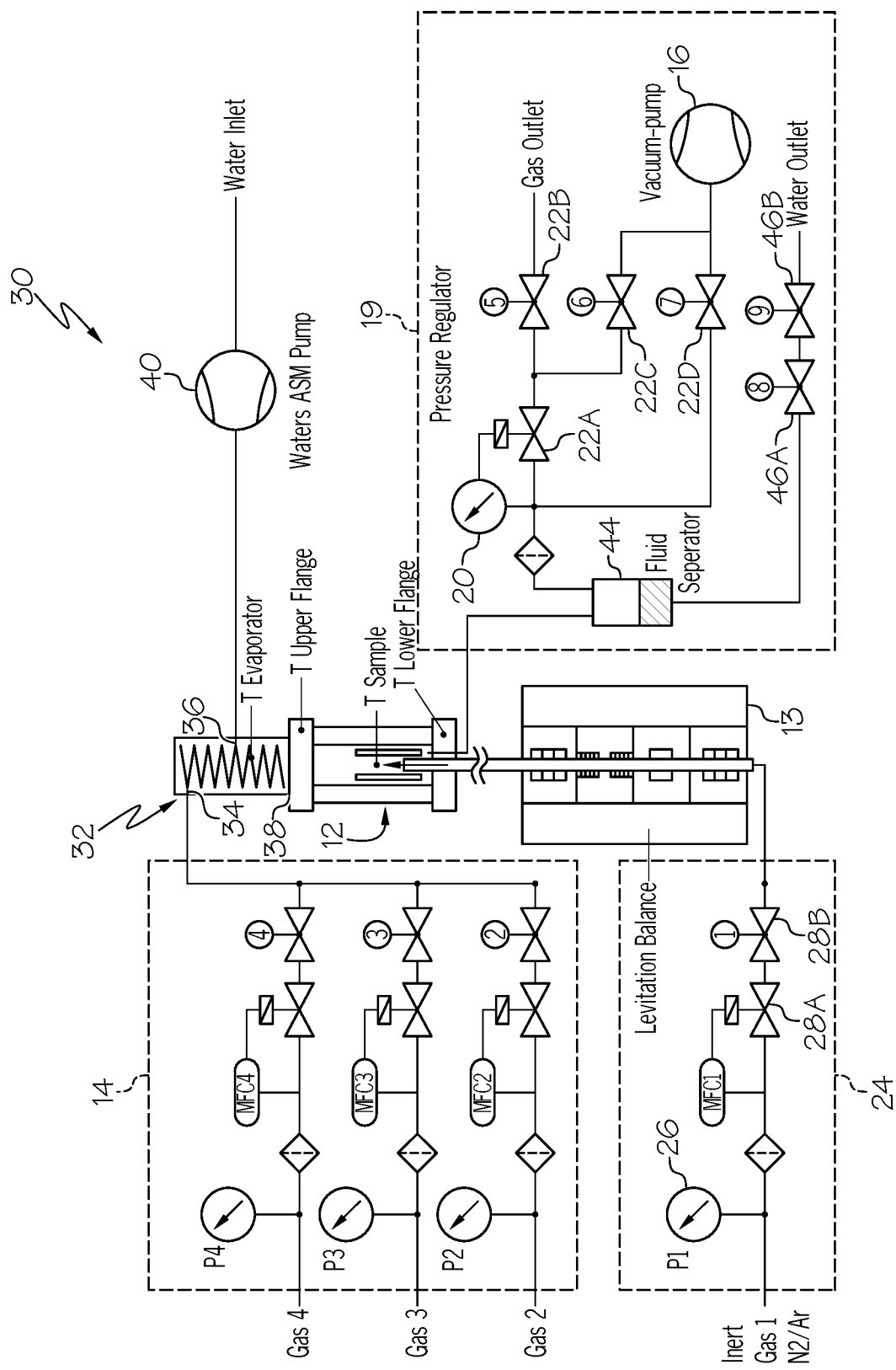
FIG. 2 is a schematic depiction of a HP-TGA system that can provide a steam environment for a TGA sample.

For some analyses, it is desirable to use steam as oxidizing media for the sample. FIG. 2 is a schematic drawing showing a configuration of a HP-TGA system 30 that can provide a steam environment for the sample. The system 30 includes similar components to the system 10 described above and further includes an evaporator 32 having a first inlet 34 that receives a flow of one or more gases, a second inlet 36 that receives a flow of water from a water pump 40 (or other source of liquid) and an outlet 38 to provide a mixture of the vapor and the gas or gas mixture to the furnace 12. In some embodiments, the water is provided to the evaporator 32 with nanofluidic resolution. For example, the water flow may be as small as approximately 0.1 µL per minute and may exceed 80 µL per minute. Inside the evaporator 32, the water is evaporated and mixed with the gas flowing to the furnace 12.

The water arriving at the second inlet 36 of the evaporator 32 is cold relative to the furnace temperature. For example, the water temperature may be approximately equal to the ambient environment of the system 30. Similarly, the gas flow received at the first inlet 34 is cold relative to the furnace temperature; however, the gas flow is preheated inside the evaporator 32 before the water is introduced into the gas flow. For example, the gas flow may be heated to a temperature in a range from approximately 200° C. to approximately 300° C. The preheated gas flow provides greater energy to the water for mixing. Steam may be exhausted from the furnace 12 into a module 19 which includes components similar to those in the module 18 of FIG. 1 and further includes a gas-liquid separator 44. The dry gas is then used again to control the pressure in the measuring cell/furnace after separation at ambient temperature. Once the separator 44 is filled with water to a maximum level, water is automatically released via iteratively opening and closing the valves 46A and 46B. This iteration is necessary to avoid a high pressure drop in the system 30 and thus a disturbance of the measurement.

The water pump 40 can be controlled to control the moisture level. A processor or computer (not shown) is in communication with various sensors and components of the system 30 and calculates the volume flow rate of water used to achieve a desired concentration of water in the gas flow. By way of a non-limiting example, the percentage of steam can be controlled in a range from approximately 0.1% to 50%. An operator can set a desired water concentration via a software interface. The processor or computer controls the temperature, pressure and dry gas flow conditions to achieve the desired steam concentration without condensation. If the desired concentration would result in condensation inside the measurement cell, the processor or computer sets the water flow rate to the maximum flow rate that avoids condensation. The equation of state of water is used in the calculations along with data from multiple sensors in the measurement cell, such as temperature and pressure sensors. In this way, the TGA system adapts to avoid condensation from forming in the measurement cell.

In the various embodiments described below, the highly integrated evaporator components avoid the need for heated gas and water conduits (e.g., external tubing) typically used in conventional systems. Sealing components used in the evaporator 32 enable operation at pressures that can exceed 8 MPa (80 bar). The compact size and the ability to secure the evaporator 32 close to other system components results in an overall reduction in HP-TGA system size and easier system manufacturing and assembly.

Figure 3A:
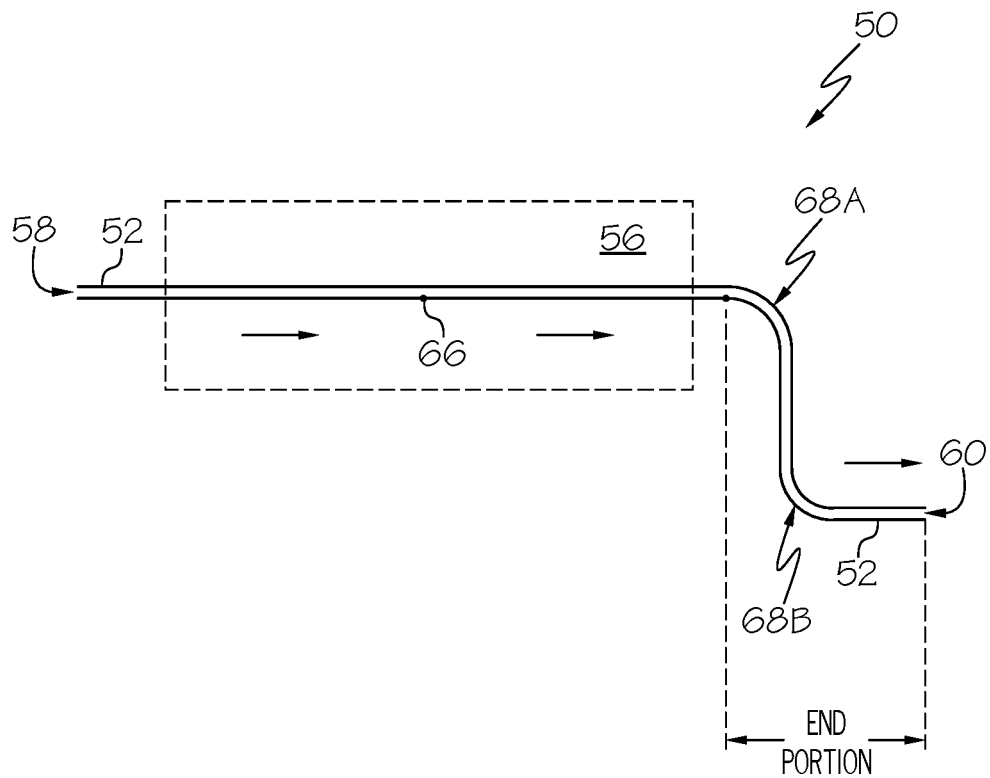
FIGS. 3A and 3B are schematic drawings showing a top view and a side view, respectively, of an embodiment of an evaporator that may be used in a HP-TGA system.
Figure 3B:
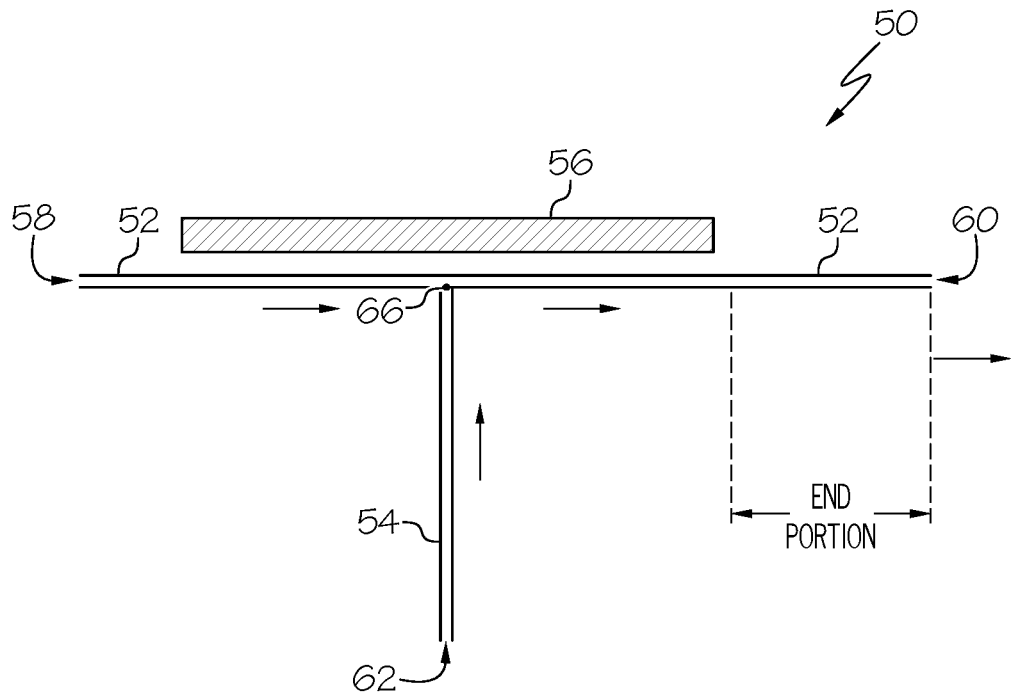

FIG. 3A and FIG. 3B are highly schematic drawings showing a top view and a side view, respectively, of an embodiment of an evaporator 50 that may be used in an HP-TGA system. The evaporator 50 includes a first fluidic channel 52, a second fluidic channel 54 and a thermally controlled heater assembly 56 (shown as a dashed transparent element in FIG. 3A to permit viewing of the first fluidic channel 52). Arrows shown adjacent to the fluidic channels indicate the direction of fluid flow.

The first fluidic channel 52 has a first channel inlet 58, a first channel outlet 60 and an end portion that extends from the first channel outlet 60 along a portion of the channel length. The heater assembly 56 is in thermal communication with the first fluidic channel 52. For example, the heater assembly 56 may be in direct contact with a conduit that defines the first fluidic channel 52 or in direct contact with a structure that has an internal channel that defines the first fluidic channel 52. The second fluidic channel 54 has a second channel inlet 62 to receive water and a second channel outlet disposed at a merge location 66 on the first fluidic channel 52. The merge location 66 is where the water is introduced into the gas flow. In alternative embodiments, a liquid other than water may be used or a mixture including two or more liquids may be used.

The first fluidic channel 52 includes at least one bend. As used herein, a bend means a deviation, or jog, in a fluidic channel such that a fluid flowing in the fluidic channel experiences a substantial change in the direction of flow (e.g., a change in a range from approximately 45° to approximately 90° with respect to the original direction of flow). As illustrated, the first fluidic channel includes two bends 68A and 68B although in alternative embodiments only a single bend may be provided, or more than two bends may be provided. Each bend 68 results in a change in the flow direction of approximately 90° and assists in the mixing of the water with the gas flow, although in alternative embodiments, the change in the flow direction due to a bend may be different. The illustrated bends 68 are defined in a plane that also includes the remainder of the first fluidic channel 52 therefore the bends 68 are not observable in the side view of FIG. 3B. In other embodiments, one or more bends may divert the flow direction out of plane and may be used to position the outlet 60 at a convenient location within an HP-TGA system.

Advantageously, each bend 68 acts as a simple mixer such that sufficient mixing occurs without the need for including a more complex structure of mixing paths and mixing wells.

Figure 4B:
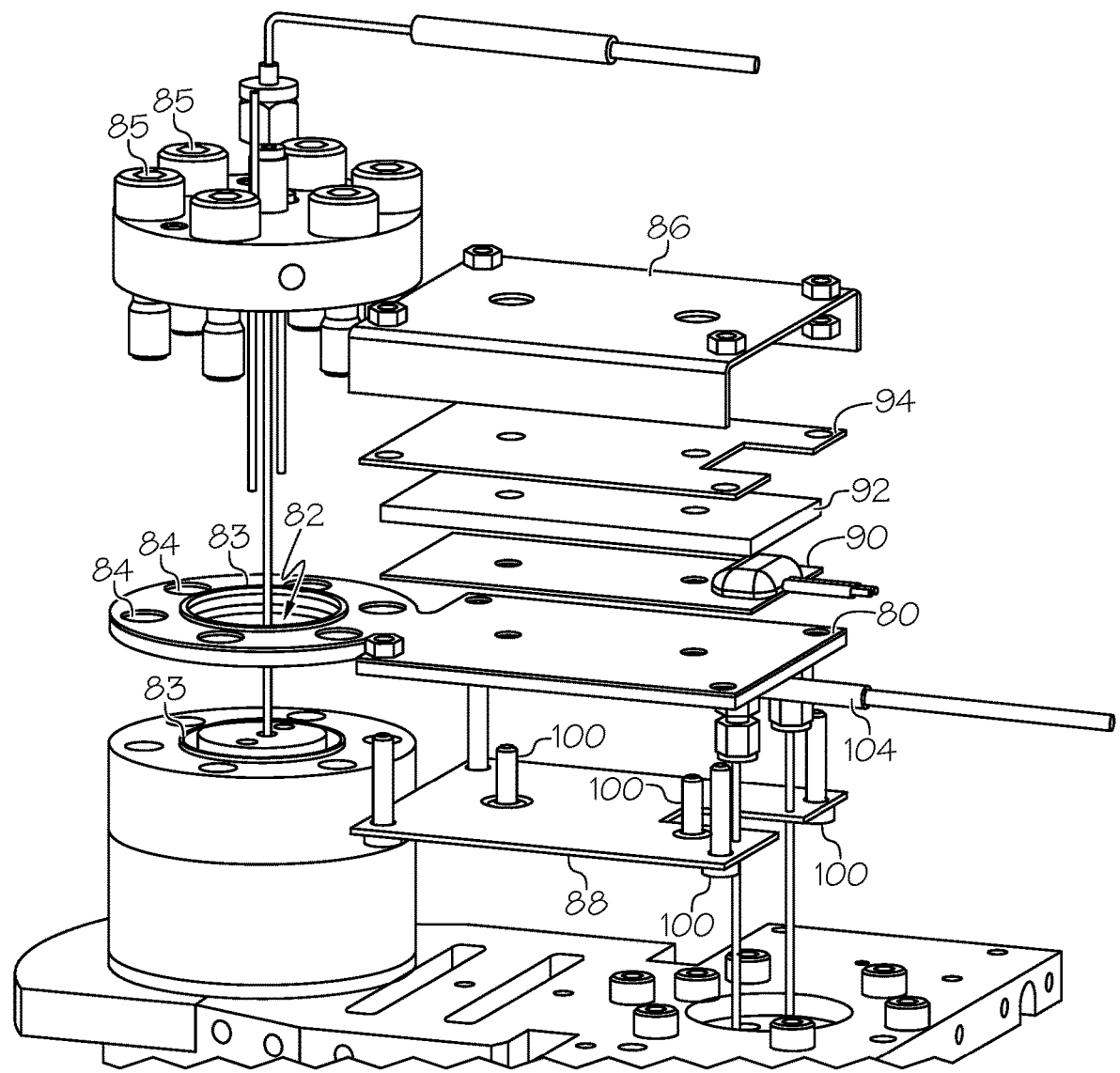

FIG. 4A and FIG. 4B show a side view and an exploded perspective side view, respectively, of the components in an upper portion of an HP-TGA system. The evaporator 80 includes a plate having a circular aperture 82 near one end where the end of a fluidic channel provides steam to the furnace 12. The circular region surrounding the opening 82 includes through holes 84 to pass bolts 85 used to secure the evaporator 80 to the furnace 12. The approximately rectangular shaped section of the plate that is opposite the circular region is enclosed withing a top hood 86 and a bottom plate 88. A heater assembly 90 and a layer of thermal insulation 92 are disposed between the upper surface of the evaporator 80 and a lower surface of a mounting plate 94. By way of a specific and non-limiting example, the heater assembly 90 may include an etched foil resistive heating element laminated between flexible electrically-insulating layers (e.g., a Thermofoil™ heater model no. HM6953 available from Minco Products, Inc. of Minneapolis, MN). The lower side of the heater assembly 90 is held against the upper surface of the evaporator 80 to enable efficient heat transfer into the evaporator 80. The thermal insulation layer 92 substantially limits thermal transfer to the mounting plate 94 so that most of the heat generated by the heater assembly 90 flows into the evaporator 80.

The evaporator 80, heater assembly 90, thermal insulation layer 92 and mounting plate 94 are held in position under the top hood 86 by bolts 100 which extend through openings in each component. The bottom plate 88 is secured to the top hood 86 and against the bottom surface of the evaporator 80 by bolts 100 that extend through holes in the top hood 86, evaporator 80 and bottom plate 88. A temperature sensor 104 is secured to the underside of the evaporator 80 to allow for monitoring and controlling temperature during measurements.

The circular region of the evaporator 80 is secured to the upper portion of the furnace 12 with bolds 85. A pair of O-rings 83 is used to seal the evaporator 80 to the furnace 12 and allows operation at high pressure. In this example, gold-plated copper O-rings are used for sealing.

Figure 5:
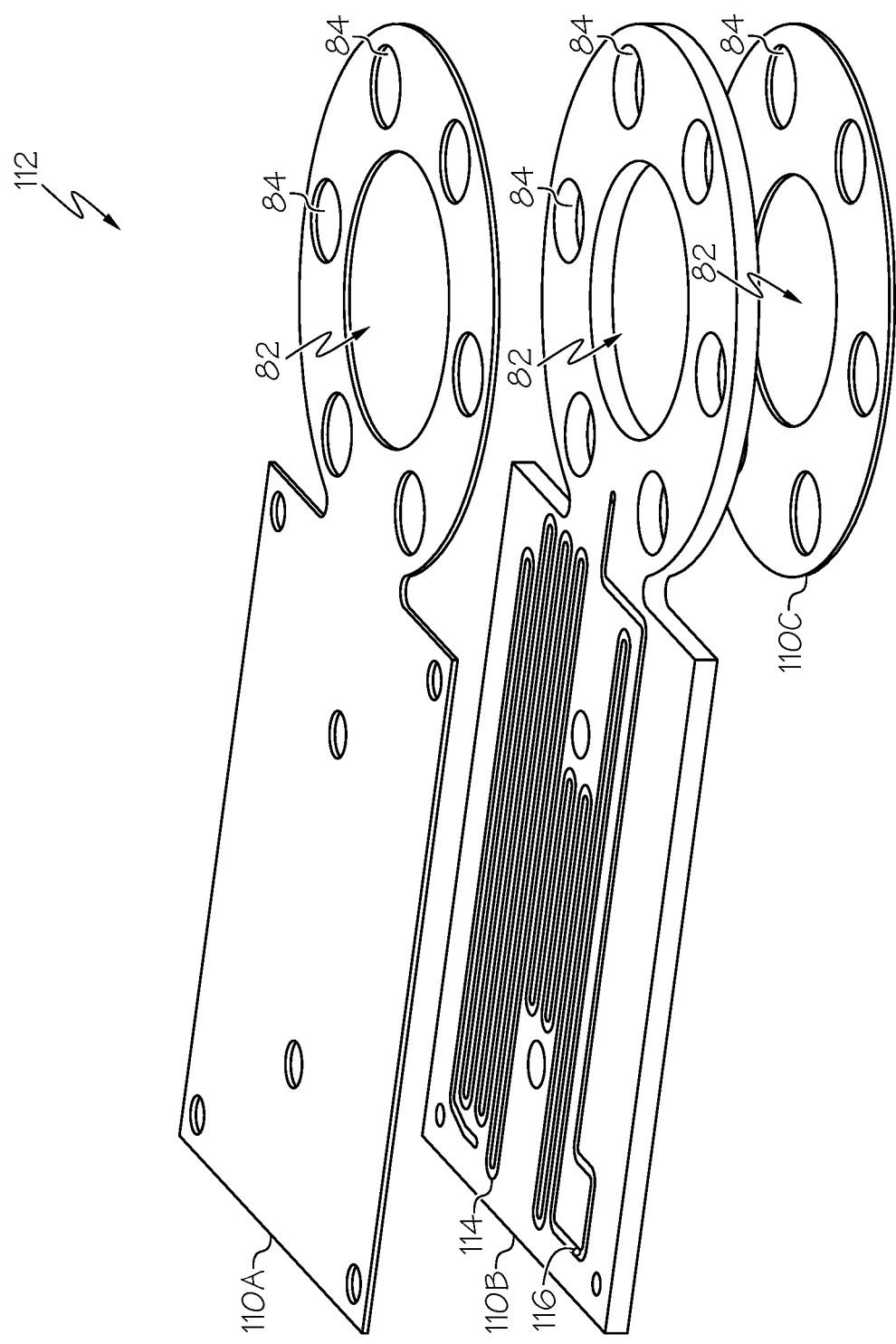
FIG. 5 is an exploded view of three layers that are bonded to each other to form one embodiment of an evaporator body.

FIG. 5 is an exploded view of three layers 110A, 110B and 110C that are bonded to each other to form an evaporator body 112 that includes an internal channel 114 that acts as the first fluidic channel 52, as shown in FIGS. 3A and 3B. The evaporator body 112 is in the form of a plate formed by a solid-state diffusion bonding process to join together the layers 110. More specifically, the layers 110 are forced against each other under pressure at an elevated temperature in vacuum. Examples of materials that may be used to create the diffusion-bonded body 110 include titanium, stainless steel, and various types of ceramics and polymers. As an example, U.S. patent publication no. 2020/0064313, incorporated herein by reference, describes a diffusion-bonded body having internal fluidic channels. The channels communicate with each other and/or ports on a surface of the body.

The channel 114 inside the evaporator body 112 is fabricated by forming a groove in the upper surface of the middle layer 110B and then placing the upper layer 110A, which has no grooves, against the upper surface of the middle layer 110B and placing the lower layer 110C against the lower surface of the middle layer 110B. In one non-limiting numerical example, the groove has a 1.60 mm (0.0625 in.) of an inch in diameter. At the outlet end 116 of the channel 114, a vertical opening through the thickness of the plate extends the fluidic channel to the lower plate surface where the steam can then pass through the upper portion of the instrument and into the furnace 12.

The layers 110 are arranged with respect to each other so that features, such as bolt through holes 84 and circular aperture 82, are properly aligned before performing the diffusion bonding process. Once bonding is completed, there is no discernible distinction between the layers 110.

Figure 6:
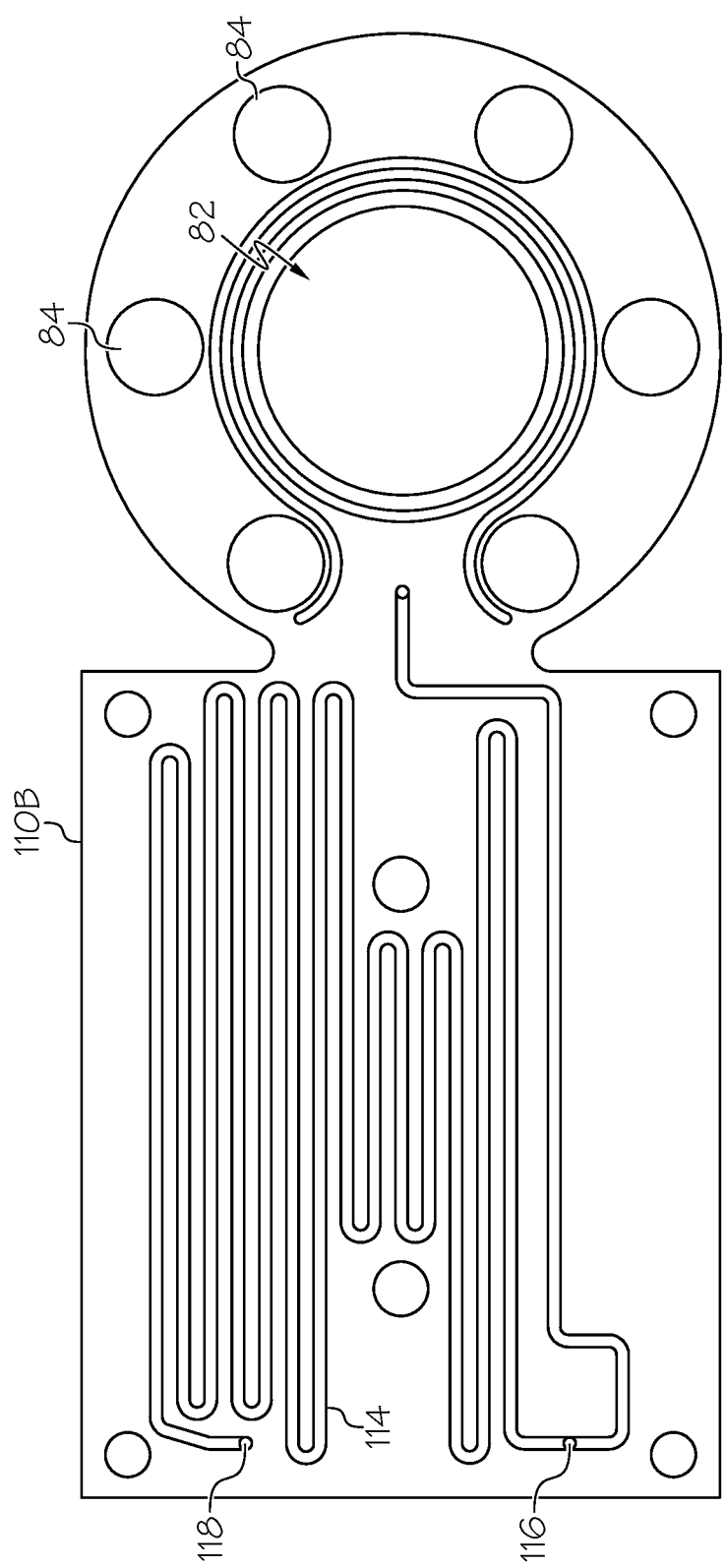
FIG. 6 is a top view of the middle layer of the evaporator body shown in FIG. 5.

FIG. 6 is a top view of the middle layer 110B shown in FIG. 5. An external conduit (not shown) delivers the gas, or mixture of gases, to an inlet coupling fixed to the upper surface of the evaporator body 112. The inlet coupling is at the top of an internal vertical channel leading to the inlet end 118 of the internal channel 114 which has a substantially serpentine path shape. By way of a non-limiting example, the internal channel 114 has a cross-sectional area of 1-2 mm$^2$ and a length of approximately 500-1,000 mm. The gas flows through the internal channel 114 and past a merge location 116 along its length. A second external conduit (i.e., the second fluidic channel of FIGS. 3A and 3B) leads to a second inlet coupling at the top of the evaporator body 112 where a nanofluidic flow of water is coupled into another internal vertical channel that leads to the merge location 116 at its opposite end. The flows of gas and water are combined at the merge location 116 and the combined flow passes through the remainder of the internal channel 114.

Figure 7A:
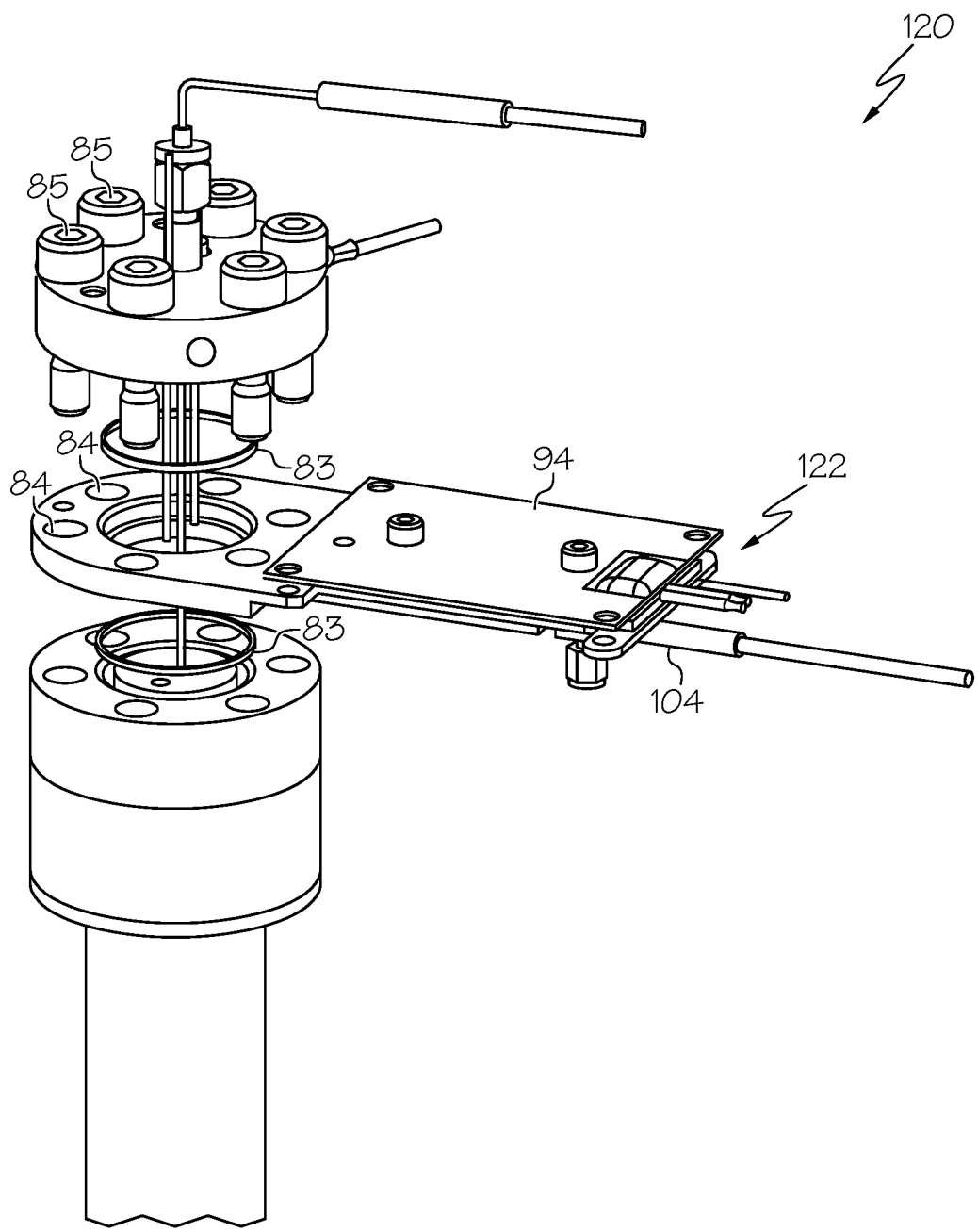
FIG. 7A is an exploded view of an upper portion of an HP-TGA system and FIG. 7B shows the components in FIG. 7A in an exploded view format.
Figure 7B:
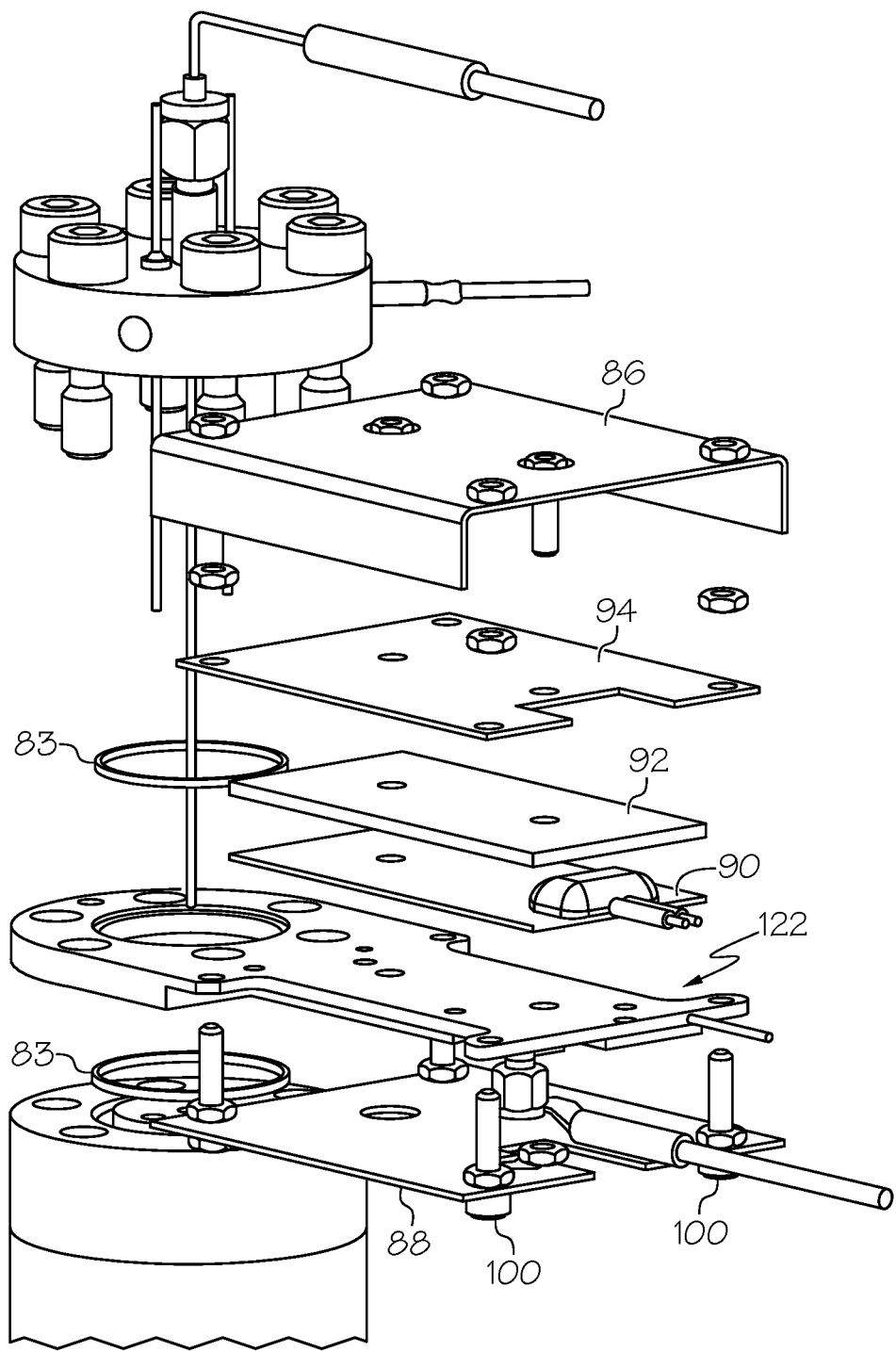

FIG. 7A is an exploded view of the upper portion of another HP-TGA system 120 and FIG. 7B is a similar view but also shows the components of the evaporator 122 separated from each other. The structure and components of the system 120 are similar to the system shown in FIGS. 4A and 4B; however, the evaporator 122 is constructed using conventional tubing and the fabrication process is simpler and less costly in comparison to fabrication of the diffusion-bonded evaporator body 112 (FIG. 6).

Figure 8:
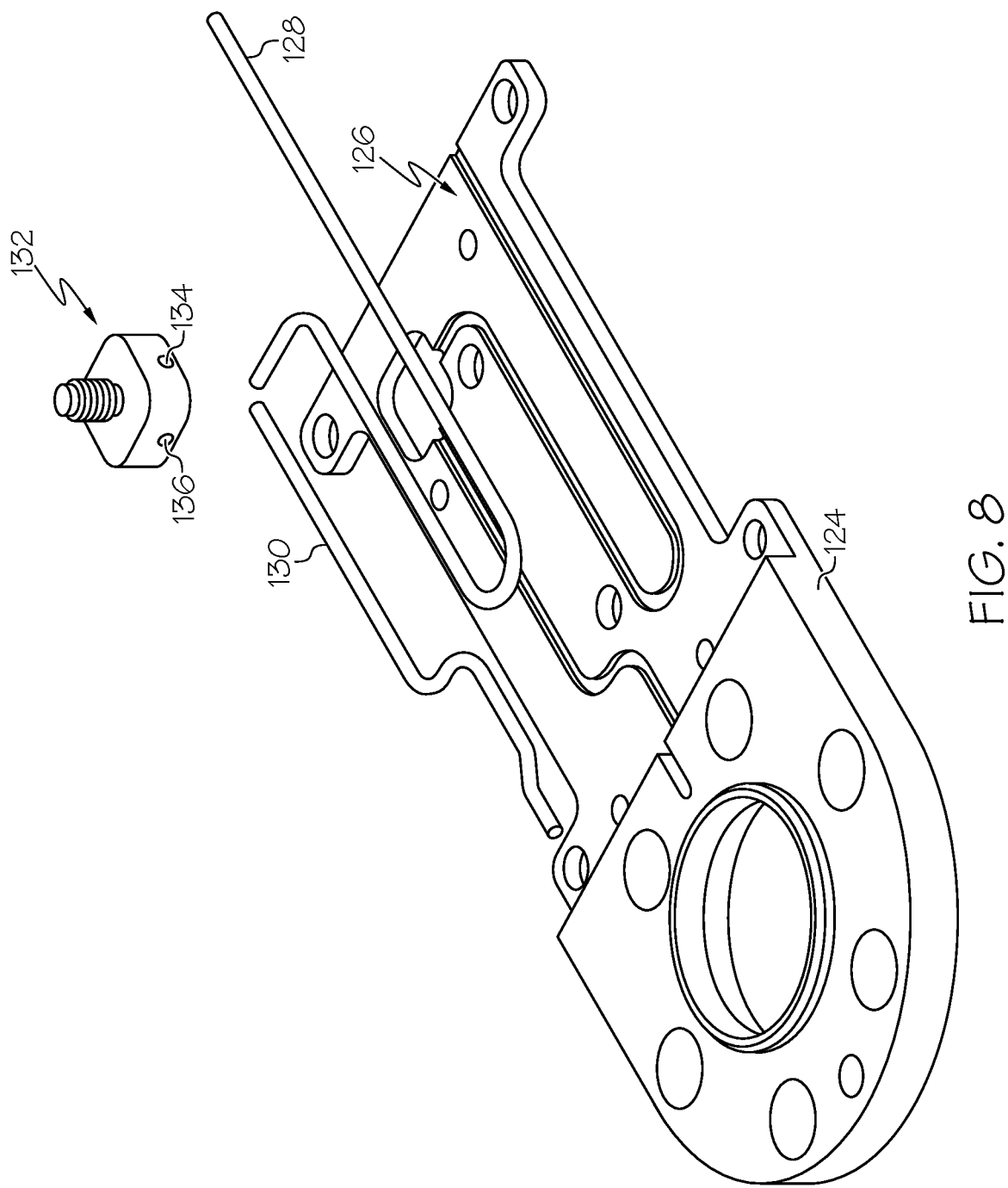
FIG. 8 is an exploded view from below of various components of the evaporator body shown in FIGS. 7A and 7B.

FIG. 8 shows an exploded view of various components of the evaporator 122 as viewed from underneath. The evaporator body 124 is formed of a thermally-conductive material and includes recessed regions in a lower surface 126 (shown as top surface in the figure) to receive a first tubing 128, second tubing 130 and a fluidic tee 132. A thermally controlled heater assembly (not shown) is attached to the evaporator body 124 on a surface 138 opposite to the lower surface 126. The inner diameter of the tubing 128 and 130 provide a similar cross-sectional area to that of the internal channel 114.

The first tubing 128 conducts the gas (or gas mixture) flow. The fluidic tee 132 receives the gas flow at a first inlet 134 and a water flow at a second inlet 136. The fluidic tee 132 provides the mixture of the gas and water flows (steam flow) at its outlet 136. Thus, the fluidic tee 132 corresponds to the merge location 66 shown in FIGS. 3A and 3B. The path length through the tubing 128 and 130 is substantially less than the length of the internal channel 114 in the diffusion-bonded evaporator body 112. The shorter length is sufficient to achieve the desired heating of the gas prior to mixing with the flow of water.

While various examples have been shown and described, the description is intended to be exemplary, rather than limiting and it should be understood by those of ordinary skill in the art that various changes in form and detail may be made therein without departing from the scope of the invention as recited in the accompanying claims.

The invention claimed is:

1. A thermogravimetric analyzer system comprising:
    a gas supply module;
    a source of liquid;
    an evaporator that evaporates the source of liquid, the evaporator comprising:
        a first fluidic channel having a first channel inlet in fluidic communication with the gas supply module, a first channel outlet, and an end portion extending from the first channel outlet, wherein the end portion of the first fluidic channel includes a bend to redirect a flow of a mixture of the source of fluid and an output from the gas supply module within the first fluidic channel;
        a thermally controlled heater assembly in thermal communication with the first fluidic channel; and
        a second fluidic channel having a second channel inlet in fluidic communication with the source of liquid and having a second channel outlet disposed on the first fluidic channel at a merge location between the first channel inlet and the first channel outlet, the bend downstream from the merge location, the thermally controlled heater assembly in thermal communication with the merge location;
    a furnace having a furnace inlet in fluidic communication with the first channel outlet and a furnace outlet in fluidic communication with a back-pressure regulator that regulates the furnace; and
    a processor in communication with the gas supply module, the thermally controlled heater assembly and the back-pressure regulator, the processor configured to control a temperature, pressure and vapor concentration in the furnace.

2. The thermogravimetric system of claim 1 further comprising a gas-liquid separator in fluidic communication with the furnace outlet.

3. The thermogravimetric system of claim 1 further comprising a levitation balance module mechanically coupled to the furnace.

4. The thermogravimetric system of claim 1 wherein the source of liquid comprises a water pump.

5. The thermogravimetric system of claim 1 wherein the furnace comprises a sample holder to support a sample during thermogravimetric analysis measurements.

6. An evaporator comprising:
    a first fluidic channel having a first channel inlet configured to receive a flow of gas, a first channel outlet and an end portion extending from the first channel outlet, wherein the end portion includes a bend to redirect a flow of a mixture of the source of fluid and the flow of gas within the first fluidic channel;
    a thermally controlled heater assembly in thermal communication with the first fluidic channel; and
    a second fluidic channel having a second channel inlet configured to receive a flow of liquid and having a second channel outlet disposed on the first fluidic channel at a merge location between the first channel inlet and the first channel outlet of the first fluidic channel, the bend downstream from the merge location, the thermally controlled heater assembly in thermal communication with the merge location.

7. The evaporator of claim 6 wherein at least a portion of the first fluidic channel is defined in a plane.

8. The evaporator of claim 7 wherein a portion of the first fluidic channel between the bend and the first channel outlet extends out from the plane.

9. The evaporator of claim 8 wherein the end portion of the first fluidic channel includes a plurality of bends and wherein a portion of the first fluidic channel downstream from one of the bends extends out from the plane.

10. The evaporator of claim 6 wherein the liquid is water.

11. The evaporator of claim 7 wherein at least a portion of the first fluidic channel is defined in a plane of a diffusion-bonded body.

12. The evaporator of claim 11 wherein the thermally controlled heater assembly is in thermal contact with a side of the diffusion-bonded body.

13. An evaporator comprising:
    a first fluidic channel having a first channel inlet configured to receive a flow of gas, a first channel outlet and an end portion extending from the first channel outlet, wherein the end portion includes a bend to redirect a flow within the first fluidic channel;
    a thermally controlled heater assembly in thermal communication with the first fluidic channel; and
    a second fluidic channel having a second channel inlet configured to receive a flow of liquid and having a second channel outlet disposed on the first fluidic channel at a merge location between the first channel inlet and the first channel outlet of the first fluidic channel, wherein at least a portion of the first fluidic channel is defined in a plane,
    wherein at least a portion of the first fluidic channel is defined in a plane of a diffusion-bonded body, and
    wherein the thermally controlled heater assembly is in thermal contact with a side of the diffusion-bonded body.

* * * * *